United States Patent [19]
Faatz et al.

[11] Patent Number: 4,738,512
[45] Date of Patent: Apr. 19, 1988

[54] CYLINDRICAL MOUNTING WITH CLEARANCE-FREE FIT

[75] Inventors: Rudi Faatz, Heuchelheim; Friedrich Kolb, Wetzlar; Joachim Kuehn; Walter Mehl, both of Asslar; Siegfried Moeller, Wetzlar; Klaus Rannow, Solms; Andreas Reich, Asslar; Adolf Steuernagel, Wetzlar, all of Fed. Rep. of Germany

[73] Assignee: Ernst Leitz Wetzlar GmbH., Wetzlar, Fed. Rep. of Germany

[21] Appl. No.: 903,471

[22] Filed: Sep. 4, 1986

[30] Foreign Application Priority Data

Sep. 19, 1985 [DE] Fed. Rep. of Germany ....... 3533401

[51] Int. Cl.[4] .......................... G02B 7/02; G03B 17/00
[52] U.S. Cl. .................................. 350/245; 350/257; 354/286; 285/332
[58] Field of Search ............... 350/245, 247, 252, 255, 350/257; 354/286; 285/332, 332.1, 394

[56] References Cited

U.S. PATENT DOCUMENTS

| | | | |
|---|---|---|---|
| 2,449,121 | 9/1948 | Jones | 285/332 |
| 4,062,030 | 12/1977 | Starp | 350/257 |
| 4,364,652 | 12/1982 | Iwata et al. | 354/286 |

FOREIGN PATENT DOCUMENTS

| | | |
|---|---|---|
| 2061661 | 6/1972 | Fed. Rep. of Germany . |
| 135123 | 4/1979 | German Democratic Rep. . |
| 140087 | 2/1980 | German Democratic Rep. . |

*Primary Examiner*—John K. Corbin
*Assistant Examiner*—Loha Ben
*Attorney, Agent, or Firm*—Schwartz, Jeffery, Schwaab, Mack, Blumenthal & Evans

[57] ABSTRACT

The clearance-free fit for cylindrical mountings, in particular photographic lenses, is produced by recesses in the inner wall of a main mounting and projections in the outer wall of an individual mounting, to be fastened in the main mounting by inserting and by a relative rotary movement between the two mountings. The recesses and the projections are of such a configuration that a sufficiently large clearance s is present when the individual mounting is inserted, and this clearance is removed by turning to produce a frictional connection.

6 Claims, 2 Drawing Sheets

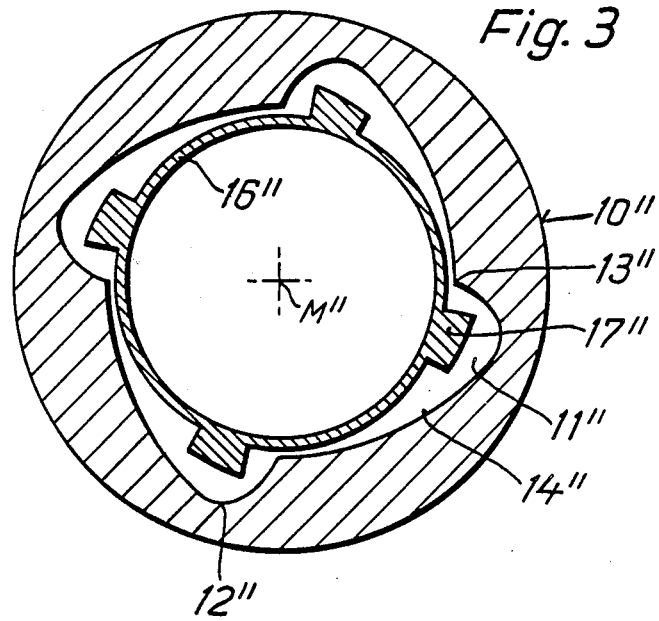
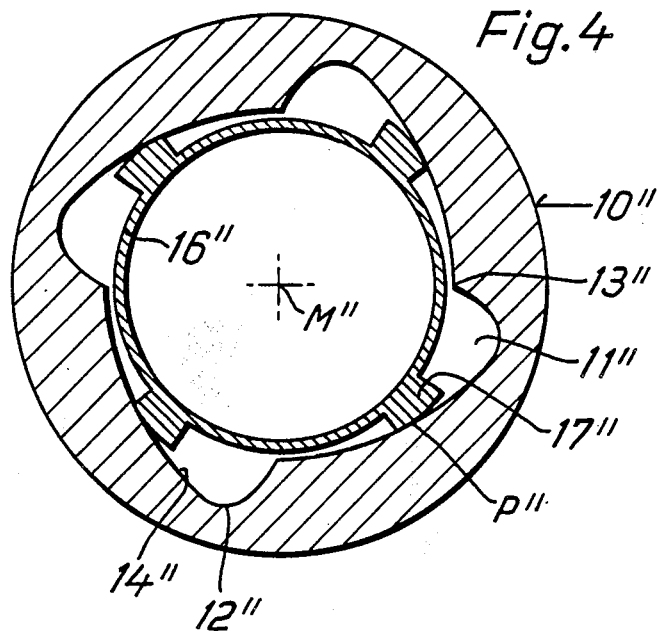

CYLINDRICAL MOUNTING WITH CLEARANCE-FREE FIT

BACKGROUND OF THE INVENTION

The present invention relates to a cylindrical mounting having a clearance-free fit, in particular, for a photographic lens. The mounting comprises a main mounting and at least one individual mounting which can be assembled therein by means of a frictional connection of the inner and outer surfaces which are correlated to one another.

A lens for high definition purposes is known from East German Pat. No. 140,087, which consists of a hollow mounting cell and of several lenses to be fastened in this mounting cell and fixed in individual mountings. For this purpose, the lenses are made as truncated cones which can be inserted into the likewise truncated-cone-shaped hollow space of the mounting cell. In this way, the cone angles of the individual mountings must correspond to that of the mounting cell, as do also the maximum and minimum diameters. This necessitates extremely close tolerances and high requirements with respect to the product accuracy. Repeated assembly and dismantling, for example, for the purpose of adjustment or selection, is difficult and requires special devices.

A lens mounting support for holding a lens system is known from German Pat. No. 2,061,661. It consists of webs which, at three locations at least of the inner wall of the mounting, are bulged up by the formation of grooves according to a non-cutting metal working process and are then calibrated. The mountings used are in one piece and therefore can be easily worked on, and the webs can be made very simply and accurately with normal tools. This known clearancefree seating is suitable for micro lenses, but in photographic lenses with stepped mountings it leads to technical difficulties in production and would also require accurate adherence to the tolerances in larger sizes.

East German Pat. No. 135,123 describes the configuration of the mounting parts of a multielement lens, wherein the surface quality on the mounting part surfaces correlated with one another is reduced and the fit tolerances on these parts are increased, as a result of which the machining effort is reduced. A frictional connection is made between the individual lens elements having metal mountings and a tube. This is accomplished by providing at least one of the surfaces of the tube and the mountings, which are correlated with one another by frictional connection, with a certain roughness height, whereby the outside diameters of the mountings are larger than the inside diameter of the tube at most by the amount of the roughness height. In this known arrangement, the frictional fixing is effected by lasting deformation of the annular structure having increased roughness height.

SUMMARY OF THE INVENTION

It is therefore an object of the present invention to provide an improved cylindrical mounting.

It is also an object of the invention to provide a cylindrical mounting which has a clearance-free fit of the type mentioned at the outset.

A particular object of the invention resides in providing such a mounting which provides a high centering accuracy, even by repeated assembly, but which requires only small diametrical tolerances in the mountings to be assembled.

Still another object of the invention is to provide a mounting which is suitable in particular for stepped mountings, especially on photographic lenses.

In accomplishing the foregoing objects, there has been provided according to the present invention a cylindrical mounting having a clearance-free fit and being suitable for photographic lenses, comprising: a generally cylindrical mounting socket having a plurality of radially symmetrical recesses in the inner circumferential surface; and a generally cylindrical mounting element adapted to fit inside of said mounting socket in a manner to provide a small clearance between the inner circumferential surface of the mounting socket and the outer circumferential surface of the mounting element, the mounting element having a plurality of radially symmetrical projections on its outer circumferential surface, these recesses and projections being correspondingly shaped such that they can be brought into contact only by a relative rotary movement between the mounting socket and the mounting element to provide a frictional connection therebetween. In one embodiment, the peripheral outlines of each of the projections and the recesses comprise a curved shape in cross-section, and the curved projections and recesses extend in adjoining relationship over the entire circumference of the respective mounting socket and mounting element. In another embodiment, the projections of the mounting element comprise a wedge shape, having a wedge angle of a slightly larger size than the slope of each recess at a point where the projections contact the recesses upon rotation.

There has also been provided in accordance with the invention a photographic lens system, comprising at least one lens and a camera body, and means for mounting the lens on the camera body, wherein the mounting means comprises the above-described mounting arrangement.

BRIEF DESCRIPTION OF THE DRAWINGS

Further details and features of the invention are apparent from the following description of three exemplary embodiments which are schematically shown in exaggerated form in the drawing, in which:

FIG. 3 shows a further embodiment in the unassembled condition in sectional front view; and FIG. 4 shows a sectional front view of the embodiment of FIG. 3 in the assembled condition.

DETAILED DESCRIPTION OF THE PREFERRED EMBODIMENTS

As a result of the fit according to the invention, the assembly requirement for clearance between the two mountings is taken into account on the one hand and the design requirement of a clearance-free fit is fulfilled on the other hand. Because of the curved projections and recesses which normally run over the entire periphery, the diameters of both the individual mounting and the main mounting are variable in any case, so that the tolerances relating to this can be made to a relatively generous size. Once the two mountings are assembled, further individual mountings or mounting subgroups corresponding to the individual mountings can be fixed in the same simple manner in the main mounting irrespective of the lens diameter, as a result of which stepped mountings can be realized. In the fit according to the invention, assembling and dismantling the mounting is effected simply by inserting and turning; this requires no considerable effort and can be automated. As a result of the radially symmetrical arrangement of the projections and recesses, a high centering accuracy is achieved, and tilting is practically impossible. In individual mountings with a circularity error, this error can in any case be eliminated when the wall thickness is small by the turning-in of the mounting and by the radially symmetrical press fit. In addition to an increase in quality of the lenses made when using the fit according to the invention, a cost reduction also results which can essentially be attributed to the smaller requirements on the diametrical tolerances and the simplified assembly.

Figure 1:
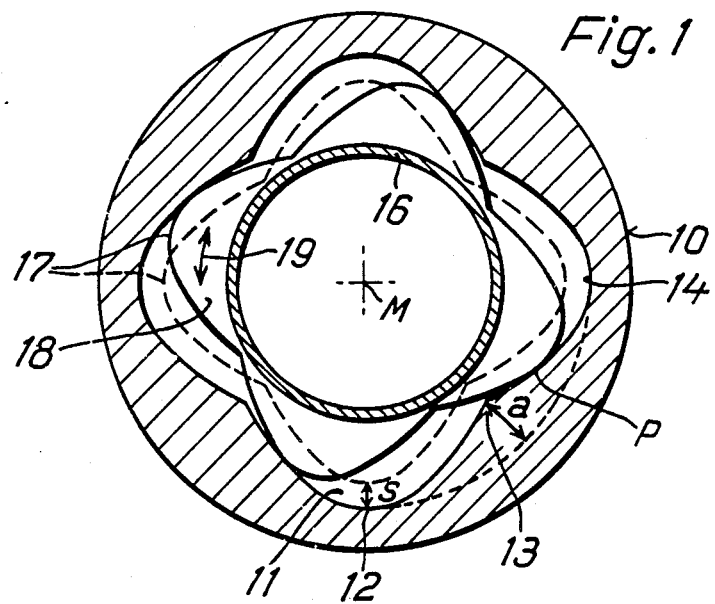
FIG. 1 shows a sectional front view of the fit according to the invention with the mounting parts.

Referring now to the drawings, in FIG. 1, a main mounting 10 is shown, the outer shape of which corresponds to a cylinder, whereas the inner wall has recesses 11 which are shown greatly exaggerated. The distances a between a valley 12 and a peak 13, that is, the points with the largest or smallest radii from the center M. are less than 1% of the diameter. The recesses 11 are of a radially symmetric arrangement and run continuously around the entire periphery of the inner wall. In this way, there are four identical curved parts 14 joined at the peaks 13. In crosssection, that is, as viewed at right angles to the optical axis, these form a clover-leaf-like peripheral line for the inner wall of the main mounting 10. Inserted into the main mounting 10 is a likewise cylindrical individual mounting 16 which is provided with projections 17 on its periphery. In the present exemplary embodiment, these projections 17 are formed as a curved part 18, like the recesses 11 of the main mounting 10, but have throughout a radius which is smaller by the value s. Here, the distance s is the clearance between the inner wall of the main mounting 10 and the outer wall of the individual mounting 16 in the unassembled condition, as shown by a broken line.

The two inner walls can be brought into contact by a rotary movement between the main mounting 10 and the individual mounting 16 and can be frictionally connected by a slight application of force. The peripheral line of the individual mounting 16 is shown as a solid line in the assembled condition. Corresponding to each of the four respective curved parts 14 and 18, there is a line contact in the assembled condition at the contact point designated as P in the drawing. It is apparent that the press fit which fixes the connection between the main mounting 10 and the individual mounting 16 is all the more favorable when the slopes of the respective curved parts 14 and 18 deviate less from one another at the contact point P, that is, the smaller the clearance s. Moreover, the connection can of course be made here by rotation in either direction shown by arrow 19 and can also be released again accordingly.

Figure 2:
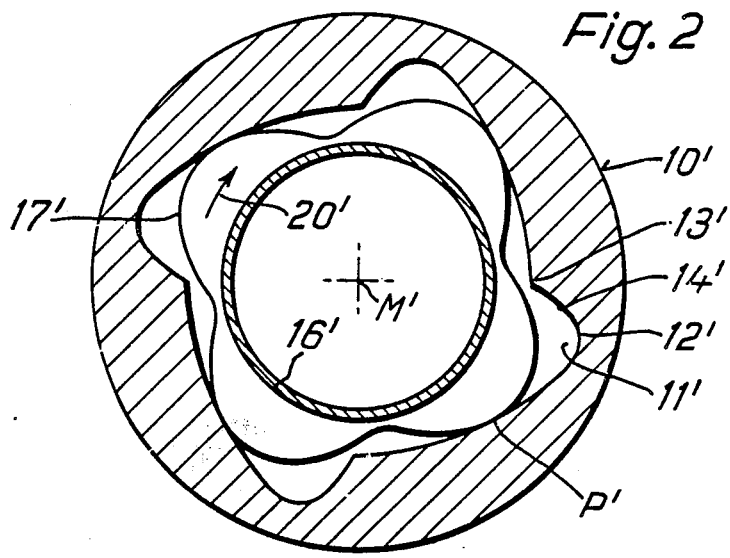
FIG. 2 shows a sectional front view of a second embodiment according to the invention.

The mounting shown in the assembled condition in FIG. 2 differs from the one according to FIG. 1 essentially by another configuration of the recesses 11' of the main mounting 10', whereas the contours of the individual mounting 16' are unchanged compared with FIG. 1. The curved parts 14' of the recesses 11' form a valley 12', from which curves of different length emanate toward the next peak 13' in each case. Thus, the radii of curvature of the curved parts 14' have a different value at each location, increasing non-uniformly from the valley 12' to both sides. The contact points P' lie on the longer curves approximately in the center between the valley 12' and the peak 13'. In this embodiment, unlike in FIG. 1, only a rotary movement in the direction of arrow 20' leads to the connection of the two mountings 10' and 16'.

FIGS. 3 and 4 show a further exemplary embodiment in which the recesses 11" of the main mounting 10" correspond to those of FIG. 2. On the other hand, the projections 17" of the individual mounting 16" are formed in a continuous, slight wedge shape here. In order that the transition at the contact points P" is made smoothly when making the fit, the projections 17" are given a wedge angle that can be adapted to the slope at P", that is, made only slightly larger than the slope (FIG. 4).

Variants of the fit described above are of course possible. Thus the recesses and projections can be shaped differently or different shapes can be combined, and/or their number can differ from that shown, e.g. there can be three of them, and/or the element designated as an individual mounting can be made up as a mounting subgroup of several members, as already mentioned. Moreover, the shaping of recesses and projections can be selected according to the machining devices available.

What is claimed is:

1. A cylindrical mounting having a clearance-free fit and being suitable for photographic lenses, comprising:
   a generally cylindrical mounting socket having a plurality of radially symmetrical recesses in the inner circumferential surface; and
   a generally cylindrical mounting element adapted to fit inside of said mounting socket in a manner to provide a small clearance between the inner circumferential surface of said mounting socket and the outer circumferential surface of said mounting element, said mounting element having a plurality of radially symmetrical projections on its outer circumferential surface, the circumferential surfaces of said recesses and projections being correspondingly shaped such that they can be brought into contact only by a relative rotary movement between said mounting socket and said mounting element to provide a frictional connection therebetween.

2. A mounting as claimed in claim 1, wherein the peripheral outlines of each of said projections and said recesses comprise a curved shape in cross-section, and wherein said curved projections and recesses extend in adjoining relationship over the entire circumference of the mounting element.

3. A mounting as claimed in claim 2, wherein the peripheral outlines of each projection and recess are at the same distance from one another, and wherein the radii of an individual curved projection comprise a different value at each location, increasing uniformly from a valley extending in both directions up to a peak.

4. A mounting as claimed in claim 3, wherein the radii of curvature of each curved recess comprise a different value at each location, and wherein said radii increase non-uniformly from a valley in both directions up to a peak.

5. A mounting as claimed in claim 2, wherein the radii of curvature of each curved recess comprise a different value at each location, and wherein said radii increase non-uniformly from a valley in both directions up to a peak.

6. A mounting as claimed in claim 1, wherein the projections of the mounting element comprise a wedge shape, having a wedge angle of a slightly larger size than the slope of each recess at a point where the projections contact the recesses upon rotation.

* * * * *